US012671484B2

(12) United States Patent
Cao et al.

(10) Patent No.: US 12,671,484 B2
(45) Date of Patent: Jun. 30, 2026

(54) SYSTEMS AND METHODS FOR RESOURCE INDICATION

(71) Applicant: ZTE Corporation, Shenzhen (CN)

(72) Inventors: Wei Cao, Shenzhen (CN); Nan Zhang, Shenzhen (CN); Shuang Zheng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 1 day.

(21) Appl. No.: 18/819,498

(22) Filed: Aug. 29, 2024

(65) Prior Publication Data

US 2024/0421882 A1      Dec. 19, 2024

Related U.S. Application Data

(63) Continuation of application No. PCT/CN2022/106065, filed on Jul. 15, 2022.

(51) Int. Cl.
H04B 7/06      (2006.01)
H04W 72/232      (2023.01)

(52) U.S. Cl.
CPC ........ H04B 7/0695 (2013.01); H04W 72/232 (2023.01)

(58) Field of Classification Search
CPC ... H04L 5/0053; H04L 5/0048; H04L 5/0051; H04L 5/0094; H04L 5/0023; H04L 5/0091; H04L 5/001; H04L 5/005; H04L 5/0007; H04L 5/0044; H04L 5/0055; H04L 5/0092; H04W 72/23; H04W 72/046; H04W 74/0833; H04W 72/0446; H04W 16/28; H04W 24/10; H04W 76/27; H04W 24/08; H04B 7/0617; H04B 7/0695; H04B 7/088; H04B 7/06952; H04B 7/0626; H04B 7/06964; H04B 7/0408; H04B 7/0639; H04B 7/06968; H04B 7/0456; H04B 7/0632; H04B 7/063; H04B 17/318

See application file for complete search history.

(56) References Cited

U.S. PATENT DOCUMENTS

| | | | |
|---|---|---|---|
| 12,193,038 B2 * | 1/2025 | Kim | ...................... H04W 72/20 |
| 2019/0215845 A1 | 7/2019 | Hu et al. | |
| 2020/0068548 A1 | 2/2020 | Guan et al. | |
| 2020/0351044 A1 * | 11/2020 | Hessler | ................. H04L 5/0048 |
| 2021/0258133 A1 * | 8/2021 | Raghavan | .............. H04B 1/525 |

(Continued)

FOREIGN PATENT DOCUMENTS

| | | |
|---|---|---|
| CN | 110268640 A | 9/2019 |
| CN | 113597804 A | 11/2021 |

(Continued)

OTHER PUBLICATIONS

Extended European Search Report for EP Appl. No. 22950730.6, dated Mar. 20, 2025 (11 pages).

(Continued)

*Primary Examiner* — Eva Y Puente
(74) *Attorney, Agent, or Firm* — Foley & Lardner LLP

(57) ABSTRACT

Presented are systems and methods for resource indication. A network node may receive at least one of (i) beam information and (ii) time domain information from a wireless communication node. The time domain information can be to indicate a time interval in which the beam information can be to be applied by the network node.

20 Claims, 6 Drawing Sheets

(56) References Cited

U.S. PATENT DOCUMENTS

| | | | | |
|---|---|---|---|---|
| 2022/0167395 A1* | 5/2022 | Wu | .................... | H04W 72/23 |
| 2023/0262482 A1 | 8/2023 | Liu | | |
| 2024/0022315 A1 | 1/2024 | Kusashima et al. | | |

FOREIGN PATENT DOCUMENTS

| | | | |
|---|---|---|---|
| CN | 113972969 | A | 1/2022 |
| EP | 4 191 925 | A1 | 6/2023 |
| JP | 2023-025740 | A | 2/2023 |
| WO | WO-2017/218794 | A1 | 12/2017 |
| WO | WO-2022/025740 | A1 | 2/2022 |
| WO | WO-2022/082774 | A1 | 4/2022 |
| WO | WO-2022/113809 | A1 | 6/2022 |

OTHER PUBLICATIONS

Samsung, "Side control information to enable NR network-controlled repeaters", 3GPP TSG RAN WG1 #109-e, R1-2203921, May 20, 2022, e-Meeting (10 pages).
ZTE, "Discussion on side control information to enable NR network-controlled repeaters", 3GPP TSG RAN WG1 #109-e, R1-2203237, May 20, 2022, e-Meeting (13 pages).
International Search Report on Written Opinion for PCT Appl. No. PCT/CN2022/106065 mailed Dec. 16, 2022 (6 pages).
First Office Action for CN Appl. No. 202280098230.9, dated Aug. 21, 2025 (with English translation, 21 pages).
Notice of Reasons for Rejection for JP Appl. No. 2024-554660, dated Oct. 1, 2025 (with English translation, 10 pages).
Office Action for CA Appl. No. 3,254,003 dated Nov. 3, 2025 (8 pages).

* cited by examiner

600

610

Receive, by a network node from a wireless communication node at least one of, (i) beam information and (ii) time domain information, wherein the time domain information is to indicate a time interval in which the beam information is to be applied by the network node

SYSTEMS AND METHODS FOR RESOURCE INDICATION

CROSS-REFERENCE TO RELATED APPLICATION

This application claims the benefit of priority under 35 U.S.C. § 120 as a continuation of PCT Patent Application No. PCT/CN2022/106065, filed on Jul. 15, 2022, the disclosure of which is incorporated herein by reference in its entirety.

TECHNICAL FIELD

The disclosure relates generally to wireless communications, including but not limited to systems and methods for resource indication.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium of the following. A network node (e.g., a network controlled repeater (NCR), a reconfigurable intelligent surface (RIS)) may receive at least one of (i) beam information and/or (ii) time domain information (e.g., time resource information for application of a beam) from a wireless communication node. The time domain information can be to indicate a time interval in which the beam information is to be applied by the network node. In some embodiments, the network node is to use or operate one of following according to the beam information and the time domain information: a first control link from the wireless communication node to the network node; a second control link from the network node to the wireless communication node; a first forwarding link from the wireless communication node to the network node; a second forwarding link from the network node to the wireless communication node; a third forwarding link from the network node to the wireless communication device; or a fourth forwarding link from the wireless communication device to the network node.

In some embodiments, the beam information may comprise at least one of: an index of a beam, or an index of a source reference signal corresponding to the beam. The time domain information may comprise at least one of: an applicable time defined by a plurality of parameters, a time offset, or a time domain granularity. The applicable time can be defined by at least one of: a start time, the start time and a duration, the start time and an end time, a start and length indicator value (SLIV) representing the start time and the duration, or a bit map corresponding to a plurality of time intervals wherein each bit value of the bit map may indicate whether the beam information can be applied at a corresponding one of the plurality of time intervals.

In some embodiments, the duration may comprise at least one of: a first value (e.g., Lslot) indicating a number of slots, or a second value (e.g., Lsymbol) indicating a number of symbols. The time offset may comprise at least one of: a slot offset, to indicate an offset of a number of slots, from a defined slot, or a symbol offset, to indicate an offset of a number of symbols, from a defined symbol. The time domain granularity may comprise at least one of: a flag (e.g., a defined parameter or bit value) indicating whether symbol level or slot level granularity is used for the at least one of: an applicable time, or a time offset, or a bit map of bit values for a plurality of slots, wherein each bit value of the bit map indicates whether symbol level or slot level granularity is used for at least one of: an applicable time, or the time offset, in a corresponding one of the plurality of slots.

In some embodiments, the beam information is to be applied upon (e.g., when, or responsive to) the network node receiving the beam information. The beam information can be to be applied at the time offset after a time at which the network node receives the beam information. The beam information can be applied until another beam information is received by the network node.

In some embodiments, the network node may receive a configuration (e.g., a RRC message) or an indication (e.g., a MAC CE, a DCI message) of an absolute length of a symbol or a slot of a band of the at least one of the plurality of forwarding links from the wireless communication node (e.g., a BS). The configuration or the indication may comprise a scaling factor for the band, that can be relative to a subcarrier spacing (SCS) of a control link (or a specific reference link) between the network node and the wireless communication node. The network may receive the time domain information via a radio resource control (RRC) message from the wireless communication node. The network may receive the time domain information via a medium access control control element (MAC CE) message from the wireless communication node. The network may receive the time domain information via a downlink control information (DCI) from the wireless communication node.

In some embodiments, the time domain information may further comprise a periodicity of the duration (e.g., a period of a valid duration). The network node may receive a plurality of the time domain information via a radio resource control (RRC) message from the wireless communication node. The network node may receive one of the plurality of time domain information to apply via a medium access control control element (MAC CE) message from the wireless communication node. The network node may receive a set of time domain information from the plurality of time domain information via a medium access control control element (MAC CE) message from the wireless communication node. The network node may receive the time domain information from the set to apply via a downlink control information (DCI) message from the wireless communication node.

In some embodiments, the network node may receive a plurality of time domain information via a radio resource control (RRC) message from the wireless communication node. The network node may receive the time domain information from the plurality of time domain information to apply via a downlink control information (DCI) message from the wireless communication node. The time domain information can be associated with the beam information.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

1. Mobile Communication Technology and Environment

Figure 1:
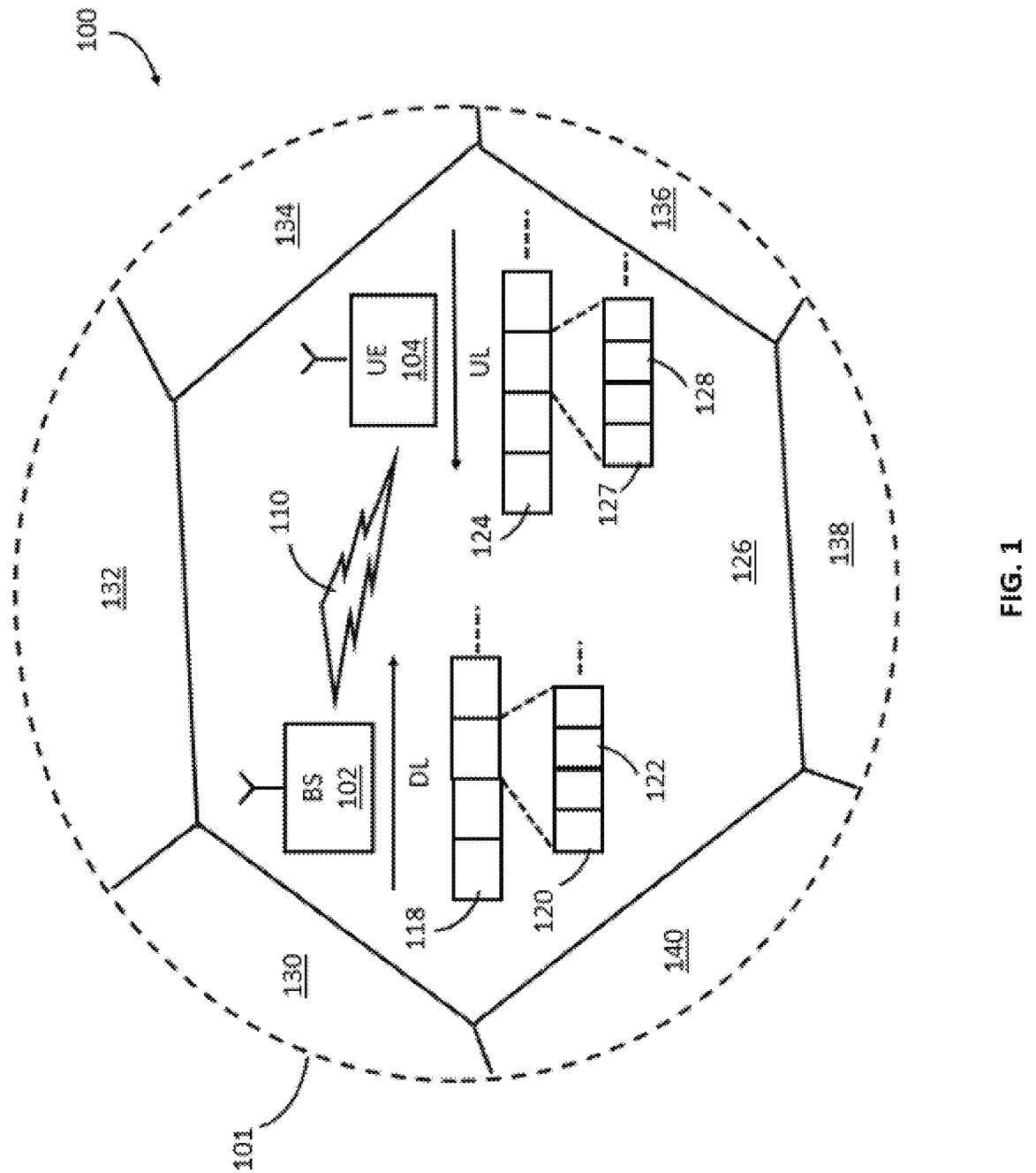
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
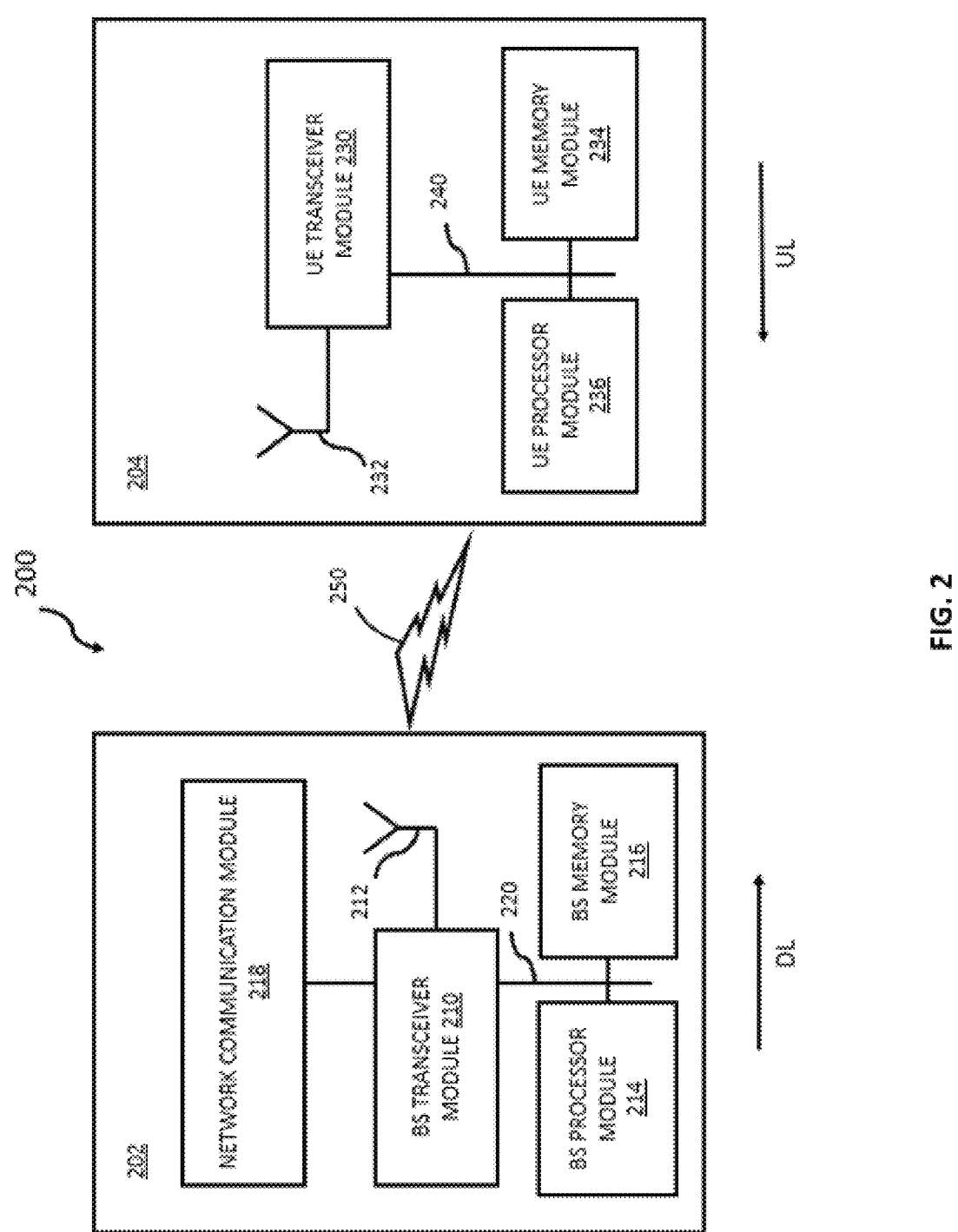
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Resource Indication and/or Use of at least one Channel As a new radio (NR) system moves to higher frequencies (e.g., around 4 GHz for frequency range 1 (FR1) deployments, above 24 GHz for frequency range 2 (FR2) deployments), propagation conditions may degrade compared to lower frequencies, which can exacerbate coverage challenges. As a result, further densification of cells may be necessary. While a deployment of regular full-stack cells is preferred, the deployment may not always be a possible (e.g., no availability of backhauls) and/or economically viable option. To provide a blanket coverage in cellular network deployments with relatively low cost, radio frequency (RF) repeaters with full-duplex amplify-and-forward operation can be used in 2G, 3G and 4G systems. However, a RF repeater may not be efficient for a 5G NR system, which can use beam management to facilitate directional transmission in the high frequency bands defined for time division duplex (TDD). The RF repeater without beam management functions may not provide suitable beamforming gain in signal forwarding, and may lead to unwanted interference.

To cope/deal/manage with the above problems, a network controlled repeater (NCR) can be considered, which may make use of control information from a BS to enable an intelligent amplify-and-forward operation. The control information can include both beam information and an applicable resource. The NCR (which may sometimes be referred to as a network node, or a smart node/repeater) may use an indicated beam (e.g., indicated according to beam information) and the applicable resource (e.g., indicated according to time resource information) to carry out/perform/implement the amplify-and-forward operation(s). In this disclosure, a method for a resource information associated with the beam information is proposed for a wireless network with the NCR.

RF repeaters can be used in 2G, 3G and 4G deployments to supplement coverage provided by regular full-stack cells with various transmission power characteristics. The RF repeaters may constitute the simplest and most cost-effective way to improve network coverage. The main advantages of RF repeaters can be low-cost, ease of deployment, and the fact that the RF repeaters may not increase latency. The main disadvantage can be that the RF repeaters can amplify signal and noise. Hence, the RF repeaters may contribute to an increase of interference (e.g., signal pollution) in the system. Within RF repeaters, there can be different categories depending on power characteristics and an amount of spectrum that the RF repeaters can be configured to amplify (e.g., single band, multi-band). The RF repeaters can be a non-regenerative type of relay nodes, and can simply amplify-and-forward signal in an omnidirectional way.

Figure 3:
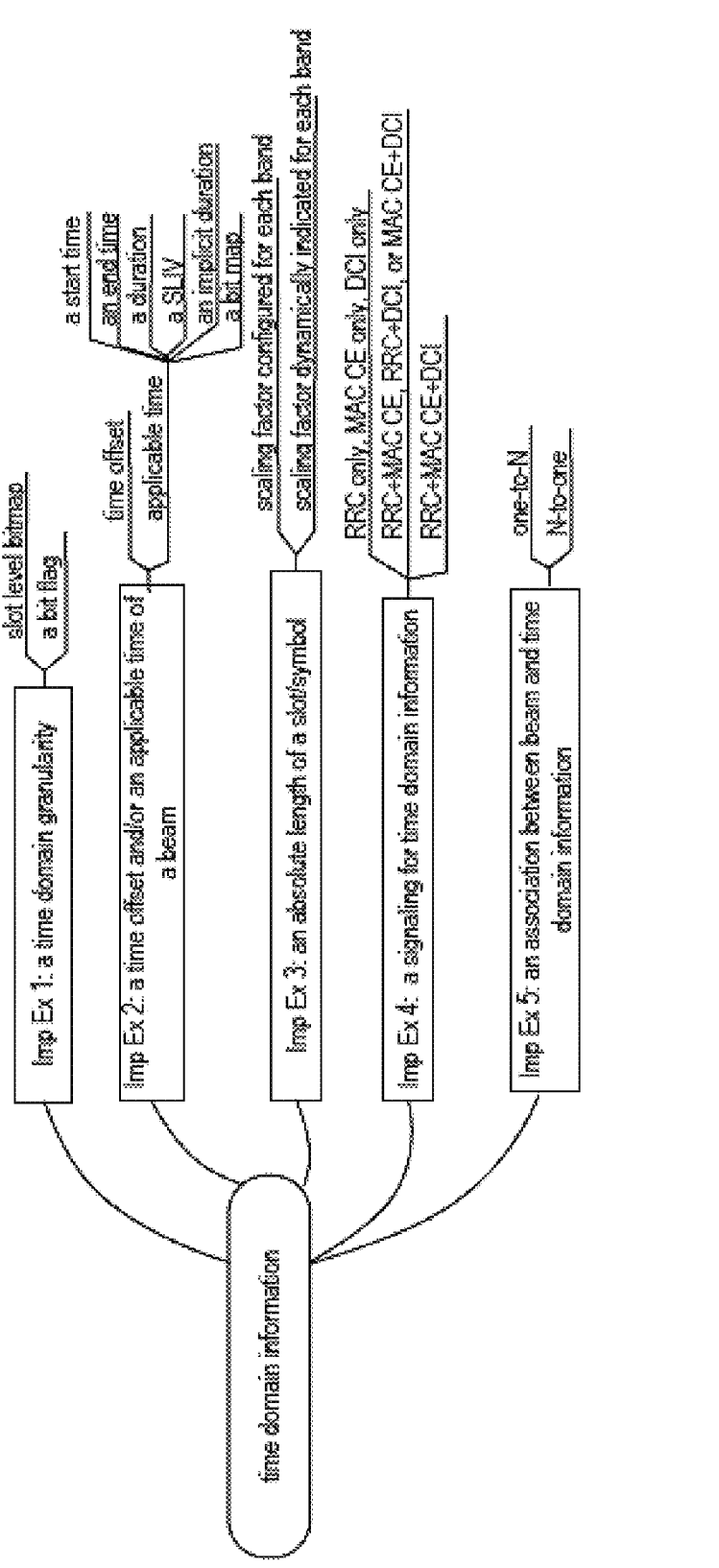
FIG. 3 illustrates an example implementation for resource indication, in accordance with some embodiments of the present disclosure.

From the perspective of functionality, a general structure of a NCR is provided in FIG. 3. A NCR-Controller may maintain a control link (C-link) between a BS and a NCR to enable information exchanges (e.g., carrying side control information). A NCR-RU (e.g., radio unit) may use a forwarding link (F-link), which can refer to an F-link for backhaul (e.g., F-links 1&2) and an F-link for access (e.g., F-links 3&4), to forward data between a BS and UE(s). The behavior of F-link(s) can be controlled according to received side control information from the BS.

Figure 4:
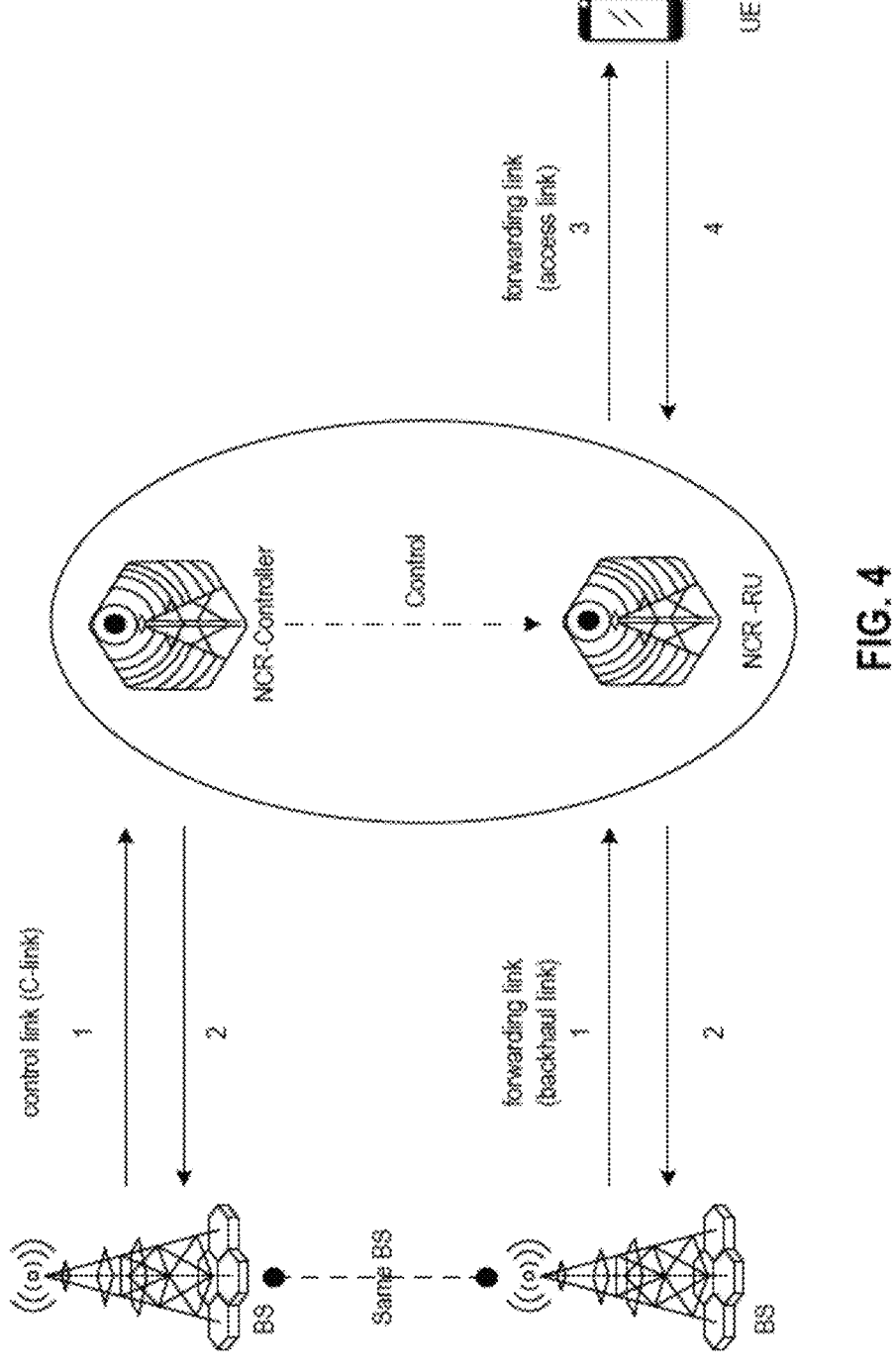
FIG. 4 illustrates an example implementation of a network controlled repeater (NCR), in accordance with some embodiments of the present disclosure.

The transmission links between the BS to NCR and the NCR to UE as shown in FIG. 4 can be defined/described/provided as follows:

C-link 1: Control link from BS to NCR CU;
C-link 2: Control link from NCR CU to BS;
F-link 1: Forwarding link from BS to NCR FU;
F-link 2: Forwarding link from NCR FU to BS;
F-link 3: Forwarding link from NCR FU to UE; and
F-link 4: Forwarding link from UE to NCR FU.

A control link can refer to or mean that the signal from one side may be detected and decoded by the other side, so that the information transmitting in the control link can be utilized to control the status of forwarding links. A forwarding link can mean that the signal from the BS or the UE is unknown to (or not parsed/decoded/inspected by) NCR FU. In this case, the NCR FU can amplify and forward signals without decoding them. For example, the F2 and F4 links can correspond to or be associated with the complete uplink (UL) forwarding link from UE to BS, in which F2 is the NCR FU UL forwarding link. Additionally, the F1 and F3 links can correspond to or be associated with the complete DL forwarding link from BS to UE, in which F3 is the NCR FU DL forwarding link.

The NCR may communicate with the BS and/or the UE according to information (e.g., time domain information or beam information) from the BS and/or the UE. In some embodiments, the NCR may use/need/require resource information associated with NCR's beam used on F-links. The NCR's beam can be represented/identified by a beam index or a source reference signal corresponding to the beam (e.g., a reference signal in specific transmission configuration indicator (TCI) states). The resource information may include time and/or frequency domain information. Furthermore, the time domain information in this disclosure can be used to indicate an applicable time for the NCR's other operations (e.g., power control, on-off).

The resource information (e.g., time domain information of one or more resources) may be sent to the NCR by an indication from the BS and/or the UE. The time domain information may include at least one of following aspects: (1) Parameter(s) to define an applicable time; (2) a time offset; or (3) a time domain granularity.

In some embodiments, the parameter(s) to define the applicable time may include at least one of: (i) a start time of a beam; (ii) an end time of a beam; or (iii) a duration that starts from the start time. In some embodiments, the start time of the beam can be the start of a time domain resource. The NCR may use an indicated beam from the start time for a forwarding operation. In some embodiments, the end time of the beam (and/or end time of the duration) can be the end of a time domain resource. The NCR may stop using an indicated beam from the end time for a forwarding operation. In some embodiments, the duration can be a time interval that can be applicable to an indicated beam in a forwarding operation of the NCR.

In some embodiments, the time offset may be a necessary delay, including a propagation delay, or a NCR's processing delay. The start time of the beam may not be earlier than the time offset. If the start time of the beam equals to the time offset, one of these two can be omitted.

In certain embodiments, the time domain granularity can be the time unit used in the forwarding operation, which can be symbol level and/or slot level. A slot offset can indicate an offset of a number of slots from a defined slot. A symbol offset can indicate an offset of a number of symbols from a defined symbol.

Implementation Example 1: Time Domain Granularity

In the NCR's forwarding or other operation on a channel, the time domain granularity can be symbol level and/or slot level. For example, in a beam training, a symbol level granularity can be needed. In NR system, synchronization signal blocks (SSBs) and channel state information reference signals (CSI-RSs) can be used for downlink (DL) beam training, and sounding reference signal (SRS) can be used for uplink (UL) beam training. All of these reference signals (RSs) may occupy symbol level time domain resource(s). Therefore, a beam direction change on the F-link 3 with symbol level granularity may be due/appropriate/needed. For another example, in a normal data transmission, both symbol level and slot level granularity may be needed/utilized. In a NR system, a slot level scheduling can be used in a non-URLLC data transmission. For an ultra-reliable low latency communications (URLLC) case, however, a symbol level scheduling can be used to satisfy a strict latency requirement. Therefore, both the symbol level and the slot level granularity may be utilized/needed to support the NCR's beam direction change on the F-link 3.

A RS used for a beam training can be interleaved in a radio frame. As shown in FIG. 4, a 5 ms half frame including SSBs can be used/utilized as an example. The SSBs may occupy slots 0~3. To facilitate the beam training, the SSBs in slots 0~3 can be transmitted with different beams. The slot 4 may not contain a SSB. The slot 4 can be used for normal data transmission using a same beam on all symbols of slot 4. For example, the time domain information and the corresponding beam information (e.g., a beam index or a source reference signal index) for the slot 0 and the slot 4 can be as illustrated in Table 1. The time domain information may include an indication of a time domain resource.

TABLE 1

| Slot index | Time domain information | Beam index on the F-link 3 |
| --- | --- | --- |
| Slot 0 | Symbol 0~1 | 2 |
|  | Symbol 2~5 (SSB0, e.g., for beam training) | 0 |
|  | Symbol 6~7 | 3 |
|  | Symbol 8~11 (SSB1, e.g., for beam training) | 1 |
|  | Symbol 12~13 | 3 |
| Slot 4 | Whole slot | 0 |

The indication of the time domain resource for slot 0 and slot 4 may have different time domain granularities. To help the NCR to understand the indication of the time domain resource, there can be the following options.

Option 1: A BS May Configure a Slot Level Bit Map to Indicate the Granularity

A slot level bit map can be used to indicate the time domain granularity. For a 5 ms half frame, a slot level bit map with value "11110" can be configured to the NCR by the BS. The value "1" may mean/indicate a symbol level granularity can be used. The value "0" may mean/indicate a slot level granularity can be used. Accordingly, the NCR may expect/anticipate a symbol level granularity in the indication of the time domain resource for the slots marked with "1". The NCR may expect/anticipate slot level granularity in the indication of the time domain resource for the slots marked with "0". In certain embodiments, the BS can configure a slot level bit map with value "11111" to the NCR to keep the flexibility of the slot 4's scheduling. In this case, for example, the slot 4 can be used for a URLLC, in which a symbol level granularity can be supported/achieved.

Option 2: A Flag can be Used Together with the Time Domain Information

A flag can be added to the time domain information. For example, a flag with value "1" may indicate that the symbol level granularity can be used in the indication of the time domain resource. A flag with value "0" may indicate that the slot level granularity can be used in the indication of the time domain resource.

Implementation Example 2: A Time Offset and an Applicable Time of a Beam

In some embodiments, a time offset can be a time gap between a BS's control information transmission and a NCR's earliest forwarding operation according to control information. The time offset may include a propagation delay, such as a NCR's processing delay. Therefore the time offset can depend on the NCR's capability. The NCR's capability including its processing delay can be reported to the BS. The BS can determine the time offset based on the NCR's capability. The time offset may not point to a time instance later than the start time. If the time instance indicated by the time offset, and the start time is the same, one of these two parameters can be omitted.

The BS may configure the time offset to the NCR. The configurable time offset parameters can be slot level and/or symbol level. Beam information may include an indication of beam information. For example, the BS may transmit the indication of beam information to the NCR. The transmission of the indication may end in slot n. The time offset can be the symbol K2 in the slot n+K1, where K1 can be a configurable time offset with a slot level granularity and K2 can be a configurable time offset with a symbol level granularity. If the slot n+K1 uses a slot level granularity (e.g., the slot 4 in the implementation example 1), the configuration of K2 can be omitted. If the start time equals to the time offset and is omitted. The NCR may start the forwarding operation using the indicated beam from the symbol K2 in the slot n+K1. Both K1 and K2 can be zero in some implementations. In such a case, the beam can be applied (with the time domain information) by the NCR upon the reception of the beam information (e.g., from the slot n).

In some embodiments, The NCR may be deployed in different scenarios. For example, a NCR can be used to provide service for a coverage hole/gap. In this scenario, a possible beam direction on the F-link 3 may be limited (e.g., in coverage) and a beam direction change may not be frequent. For another example, a NCR can be used to enhance coverage quality for a hotspot. In this scenario, the beam direction change on the F-link 3 may be frequent. To efficiently support these scenarios, one or more of the following options can be used.

Option 1: An Applicable Time of a Beam is Indicated by at Least One of a Start Time, an End Time, or a Duration Sub-Option 1

A Start Time can be Indicated Via a Start Slot and/or a Start Symbol. The BS May Transmit beam information and/or time domain information to the NCR. The beam information may include an indication of a beam. The start time of the beam in the time domain information may include a start slot index Sslot and/or a start symbol index Ssymbol. The NCR may start a forwarding operation using an indicated beam from the symbol Ssymbol in the slot Sslot. If the slot Sslot uses a slot level granularity (e.g., the slot 4 in the implementation example 1), the indication of Ssymbol can be omitted. The start time of the beam may not be earlier than the time offset. If the start time equals to the time offset, the start time of the beam indication can be omitted.

The end time can be indicated via an end slot and/or an end symbol. The BS may transmit the beam information, a start slot index Sslot and/or a start symbol index Ssymbol, an end slot index Eslot and/or an end symbol index Esymbol to the NCR. The NCR may start the forwarding operation using the indicated beam from the symbol Ssymbol in the slot Sslot. If the slot Sslot uses a slot level granularity (e.g., the slot 4 in the implementation example 1), the indication of Ssymbol can be omitted. The start time may not be earlier than (the time instance indicated by) the time offset. If the start time equals to the time offset, the start time indication can be omitted. The NCR may stop the forwarding operation using the indicated beam from the symbol Esymbol in the slot Eslot. If the slot Eslot uses a slot level granularity (e.g., the slot 4 in the implementation example 1), the indication of Esymbol can be omitted.

A duration (e.g., a valid duration) that may start from the start time may include a slot number and/or a symbol number. A corresponding beam can be used in the valid duration periodically according to the periodicity. For example, a slot number of Lslot and a symbol number of Lsymbol can be included in the time domain information for the duration indication. The duration of the indication beam can be Lslot slots plus Lsymbol symbols for instance. If the duration is not more than a slot, the parameter Lslot can be omitted. If the duration is in the unit of slot (e.g., Lsymbol=0), the parameter Lsymbol can be omitted.

Sub-Option 2

The start time and the duration can be indicated by a combined parameter. Some examples can be provided below. A start and length indicator value (SLIV) can be defined for a duration with a predefined maximum time length.

If the duration is not more than a slot, the start symbol Ssymbol and the duration (e.g., a symbol number of Lsymbol) can be indicated using a start and length indicator value (SLIV) for instance as illustrated/shown below.

$$\text{if } (Lsymbol - 1) \le Nsymbol/2$$

$$\text{then } SLIV = Nsymbol \cdot (Lsymbol - 1) + Ssymbol$$

$$\text{else } SLIV =$$

$$Nsymbol \cdot (Nsymbol - Lsymbol + 1) + (Nysmbol - 1 - Ssymbol),$$

where $0 < Lsymbol \le Nsymbol - Ssymbol$, and Nsymbol may refer to the number of symbols contained in a slot. A valid SLIV may satisfy $Ssymbol + Lsymbol \le Nsymbol$.

If the duration is with a slot level granularity and not more than a subframe, the start slot Sslot and the duration (e.g., a symbol number of Lslot) can be indicated using a SLIV defined below.

$$\text{if } (Lslot - 1) \le Nslot/2$$

$$\text{then } SLIV = Nslot \cdot (Lslot - 1) + Sslot$$

$$\text{else } SLIV = Nslot \cdot (Nslot - Lslot + 1) + (Nslot - 1 - Sslot),$$

where $0 < Lslot \le Nslot - Sslot$, and Nslot may refer to the number of slots contained in a subframe. A valid SLIV may satisfy $Sslot + Lslot \le Nslot$.

Option 2: The Applicable Duration of a Beam is Indicated by a Dynamic Signaling

The start time can be indicated via a start slot and/or a start symbol. The BS transmits to the NCR the beam information, the start slot index Sslot and/or the start symbol index Ssymbol. The NCR starts the forwarding operation using the indicated beam (e.g., identified via the beam information) from the symbol Ssymbol in the slot Sslot. If the slot Sslot uses a slot level granularity (e.g., the slot 4 in the Embodiment 1), the indication of Ssymbol can be omitted.

In some embodiments, the duration can be determined implicitly by the beam information change. For example, a beam information can be indicated by the BS, and the NCR may use the indicated beam according to the start time that is indicated together. The NCR may maintain/retain or keep using the indicated beam until a new start time corresponding to a new indication that provides another beam information is received. For another example, if the start time of the beam equals to the time offset and is omitted in the indication from the BS, the NCR may keep using the indicated beam until a time offset corresponding to a new indication that provides another beam information is received. For another example, if the time offset is zero, the time domain information can be omitted in the indication from the BS, and the NCR may keep using the indicated beam until a new indication that includes another beam information is received.

Option 3: The Applicable Time of a Beam is Indicated by a Bit Map

Figure 5:
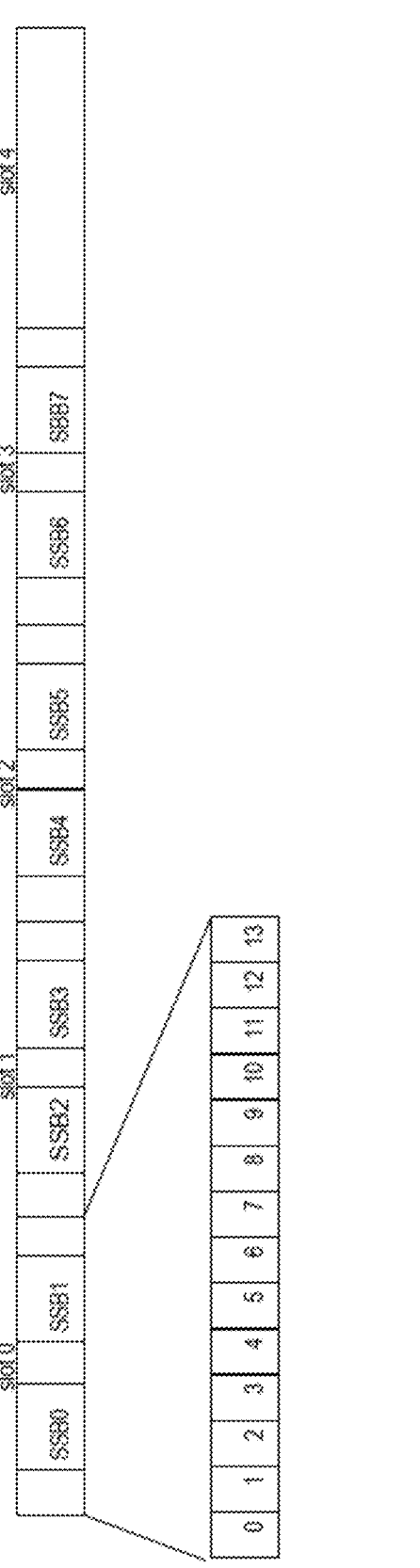
FIG. 5 illustrates an example time domain resource occupied by at least one synchronization signal block (SSB), in accordance with some embodiments of the present disclosure.

The applicable time can be indicated by a bit map. The BS may transmit beam information and a bit map indicating the applicable time of the beam to the NCR. For example, for the 5 ms half frame shown in FIG. 5, a slot level bit map with value "00001" can be indicated to the NCR by the BS. The value "1" may mean the slot 4 can be the applicable time of the beam. The value "0" may mean the slots 0~3 may be not applicable to the beam.

Implementation Example 3: An Absolute Length of a Slot/Symbol

In some embodiments, the NCR may communicate with the BS using a C-link and may forward a UL/DL signal using an F-link. The carriers used by the C-link and the F-link may not be the same. For example, FR1 can be used on the C-link to guarantee a robust control signaling reception, and FR2 can be used on the F-link to provide enough bandwidth. In such case, a subcarrier spacing (SCS) used on the C-link and the F-link may not be the same, which may lead to different symbol lengths.

Since the NCR forwards a signal on the F-link without processing, an absolute length of a slot/symbol can be determined by the SCS used on the C-link. If the NCR supports multiple bands on the F-link, the absolute length of the slot/symbol length on each band may not be the same. To support this situation, following options can be used.

Option 1: Scaling Factors are Configured (e.g., Via Radio Resource Control (RRC)) for Each Band If the F-link and the C-link use different SCSs, the BS may configure a scaling factor for each of the NCR's bands on the F-link. For example, an NCR may use FR1 on the C-link with a SCS of 15 kHz. The NCR may have 2 bands on the F-link. One of the bands may use 30 kHz SCS. The other may use 60 KHz SCS. In such case, the BS may configure a scaling factor list of [2, 4] to the NCR. The NCR may determine the absolute length of the slot/symbol used on the corresponding band on the F-link as $Tsymbol\_f=Tsymbol\_c/scaling$ factor.

Option 2: Scaling Factors are Dynamically Indicated (e.g., Via Medium Access Control Control Element (MAC CE) and/or Downlink Control Information (DCI)) for Each Band If the F-link and the C-link use different SCSs, the BS may indicate a scaling factor for one of the NCR's bands on the F-link. For example, an NCR may use FR1 on the C-link with a SCS of 15 kHz. The NCR may have 2 bands on the F-link. The BS may indicate the band index 1 and a scaling factor of 2 together with the beam information. In such case, the NCR may determine the absolute length of the slot/symbol used on the band 1 on the F-link as $Tsymbol\_f=Tsymbol\_c/scaling$ factor.

Implementation Example 4: A Signaling for Time Domain Information

The BS may use various signaling in resource indication to balance a signaling cost and an indication efficiency. For example, a UE-dedicated channel can be transmitted using semi-static resource (e.g., voice over internet protocol (VOIP) service) or dynamically scheduled resource. For a semi-static resource indication, a RRC configuration can be considered. For a dynamically scheduled resource indication, a MAC CE and/or a DCI can be more efficient/timely. To support different signaling methods, one or more of the following options can be used.

Option 1: Radio Resource Control (RRC) Only, Medium Access Control Control Element (MAC CE) Only, or Downlink Control Information (DCI) Only The time domain information (e.g., the indication of the time domain resource) can for instance be a new information element (IE) in the RRC configuration corresponding to beam information.

The time domain granularity can be a bit flag. For example, a flag with value "1" may indicate that the symbol level granularity can be used in the time domain information. A flag with value "0" may indicate that the slot level granularity can be used in the time domain information.

The time offset can be configured as described in implementation example 2. The start time can be configured as described in implementation example 2. The end time can be configured as described in implementation example 2. The duration can be configured as described in implementation example 2. The duration can be determined implicitly by a reception of a new beam indication (e.g., via a RRC reconfiguration). The period of the duration can be not shorter than the duration. The corresponding beam can be used in the duration periodically with the period of the duration. The duration can be infinite/indefinite, in some implementations. In such case, the period of the duration can be omitted. The time domain information configuration can be unchanged or continue to be used by the corresponding beam until a new configuration is received (e.g., via a RRC, a MAC CE, or a DCI).

Option 2: RRC+MAC CE, RRC+DCI, or MAC CE+DCI

A time domain information list can be included in the RRC/MAC CE corresponding to beam information. Each element of the list can be time domain information which can be determined using the method in the option 1 of implementation example 4. The BS may indicate via a MAC CE/DCI message to the NCR the selected time domain information from the configured time domain information indication list, together with the beam information.

Option 3: RRC+MAC CE+DCI

A time domain information list can be included in the RRC configuration corresponding to the beam information. Each element of the list can be a time domain information which may be determined using the method in option 1 of implementation example 4. The BS may indicate via a MAC CE message to the NCR, which may include a subset (e.g., one or more) of time domain information of the configured time domain information list. The BS may indicate a beam information and one of the time domain information from the subset via a downlink control information (DCI) message.

Implementation Example 5: An Association Between the Beam Information and the Time Domain Information The BS may configure a list of beam information and a list of time domain information to the NCR. The BS may indicate an association between the beam information and the time domain information to the NCR via a RRC/MAC CE/DCI message. The association may refer to (1) via same signaling for indication of the beam (e.g., beam information) or (2) with a defined mapping relationship. For example, the BS may indicate a one-to-N (with $N \geq 1$) mapping between the beam information and the time domain information. For another example, if the NCR supports communication with multiple beams at the same time, the BS may indicate an N-to-one (with $N \geq 1$) mapping between the beam information and the time domain information. It should be understood that one or more features from the above implementation examples are not exclusive to the specific implementation examples, but can be combined in any manner (e.g., in any priority and/or order, concurrently or otherwise).

Figure 6:
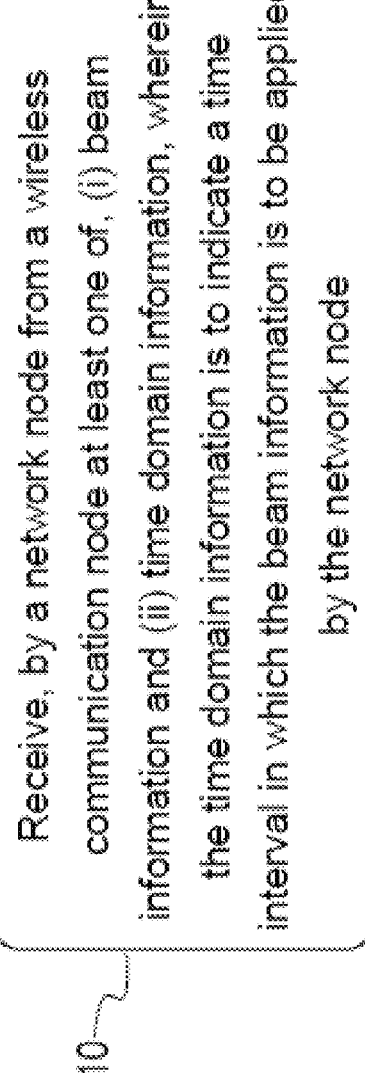
FIG. 6 illustrates a flow diagram for resource indication and/or use/operation of at least one channel, in accordance with an embodiment of the present disclosure.

FIG. 6 illustrates a flow diagram of a method 900 for resource indication. The method 600 may be implemented using any one or more of the components and devices detailed herein in conjunction with FIGS. 1-2. In overview, the method 600 may be performed by a network node, in some embodiments. Additional, fewer, or different operations may be performed in the method 600 depending on the embodiment. At least one aspect of the operations is directed to a system, method, apparatus, or a computer-readable medium.

A network node (e.g., a network controlled repeater (NCR)) may receive at least one of (i) beam information and (ii) time domain information (e.g., time resource information for application of a beam) from a wireless communication node. The time domain information can be to indicate a time interval in which the beam information is to be applied by the network node. In some embodiments, the network node is to use or operate one of following according to the beam information and the time domain information: a first control link from the wireless communication node to the network node; a second control link from the network node to the wireless communication node; a first forwarding link from the wireless communication node to the network node; a second forwarding link from the network node to the wireless communication node; a third forwarding link from the network node to the wireless communication device; or a fourth forwarding link from the wireless communication device to the network node.

In some embodiments, the beam information may comprise at least one of: an index (e.g., identifier) of a beam, or an index of a source reference signal corresponding to (or using) the beam. The time domain information may comprise at least one of: an applicable time defined by a plurality of parameters, a time offset, or a time domain granularity. The applicable time can be defined by at least one of: a start time, the start time and a duration (e.g., valid/applicable duration for the beam or the beam information), the start time and an end time, a start and length indicator value (SLIV) representing the start time and the duration, or a bit map corresponding to a plurality of time intervals wherein each bit value of the bit map may indicate whether the beam information can be applied at a corresponding one of the plurality of time intervals.

In some embodiments, the duration may comprise at least one of: a first value (e.g., Lslot) indicating a number of slots, or a second value (e.g., Lsymbol) indicating a number of symbols. The time offset may comprise at least one of: a slot offset, to indicate an offset of a number of slots, from a defined slot, or a symbol offset, to indicate an offset of a number of symbols, from a defined symbol. The time domain granularity may comprise at least one of: a flag indicating whether symbol level or slot level granularity is used for the at least one of: an applicable time, or a time offset, or a bit map of bit values for a plurality of slots, wherein each bit value of the bit map indicates whether symbol level or slot level granularity is used for at least one of: the applicable time, or the time offset, in a corresponding one of the plurality of slots.

In some embodiments, the beam information is to be applied upon the network node receiving the beam information. The beam information is to be applied at the time offset after a time at which the network node receives the beam information. The beam information can be applied/maintained/used until another beam information is received by the network node.

In some embodiments, the network node may receive a configuration (e.g., a RRC message) or an indication (e.g., a DCI message) of an absolute length of a symbol or a slot of a band of the at least one of the plurality of forwarding links from the wireless communication node (e.g., a BS). The configuration or the indication may comprise a scaling factor for the band, that can be relative to a subcarrier spacing (SCS) of a control link between the network node and the wireless communication node. The network may receive the time domain information via a radio resource control (RRC) message from the wireless communication node. The network may receive the time domain information via a medium access control control element (MAC CE) message from the wireless communication node. The network may receive the time domain information via a downlink control information (DCI) from the wireless communication node.

In some embodiments, the time domain information may further comprise a periodicity of the duration (e.g., a period of a valid duration). The network node may receive a plurality of the time domain information via a radio resource control (RRC) message from the wireless communication node. The network node may receive one of the plurality of time domain information to apply via a medium access control control element (MAC CE) message from the wireless communication node. The network node may receive a set of time domain information from the plurality of time domain information, via a medium access control control element (MAC CE) message from the wireless communication node. This set can be a subset of the plurality of time domain information. The network node may receive (an identification of) the time domain information from the set to apply, via a downlink control information (DCI) message from the wireless communication node.

In some embodiments, the network node may receive a plurality (e.g., a list/collection) of time domain information via a radio resource control (RRC) message from the wireless communication node. The network node may receive (an identification of) the time domain information from the plurality of time domain information to apply, via a downlink control information (DCI) message from the wireless communication node. The time domain information can be associated with the beam information.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:
   receiving, by a network node from a wireless communication node, beam information and time domain information,
   wherein the time domain information is associated via a one-to-one mapping relationship with the beam information,
   wherein the time domain information is to indicate a time interval in which the beam information is to be applied by the network node,
   wherein the time domain information indicates a start time and a duration,
   wherein the start time indicates a start slot and a start symbol,
   wherein the duration indicates a number of symbols, and
   wherein each of the number of symbols has an absolute length related to a subcarrier spacing (SCS).

2. The method of claim 1, wherein the network node is to use, according to the beam information and the time domain information:
   a first forwarding link from the wireless communication node to the network node;
   a second forwarding link from the network node to the wireless communication node;
   a third forwarding link from the network node to a wireless communication device; or
   a fourth forwarding link from the wireless communication device to the network node.

3. The method of claim 1, wherein the beam information comprises an index of a beam.

4. The method of claim 1, wherein the time domain information indicates an applicable time defined by a plurality of parameters.

5. The method of claim 4, wherein the applicable time has the start time that corresponds to at least one of the start slot or the start symbol, and the duration.

6. The method of claim 5, wherein the duration comprises a value indicating the number of symbols.

7. The method of claim 4, wherein the applicable time corresponds to the symbol with an absolute length determined corresponding to the subcarrier spacing (SCS).

8. The method of claim 1, comprising:
   receiving, by the network node via a downlink control information (DCI) from the wireless communication node, the time domain information and the beam information.

9. The method of claim 1, comprising:
   receiving, by the network node via a radio resource control (RRC) message from the wireless communication node, a plurality of time domain information, and
   receiving, by the network node via a downlink control information (DCI) message from the wireless communication node, an indication of the time domain information to select from the plurality of time domain information to apply.

10. A wireless communication node, comprising:

at least one processor configured to:

send, via a transmitter to a wireless network node, beam information and time domain information, wherein the time domain information is associated via a one-to-one mapping relationship with the beam information, wherein the time domain information is to indicate a time interval in which the beam information is to be applied by the wireless network node, wherein the time domain information indicates a start time and a duration, wherein the start time indicates a start slot and a start symbol, wherein the duration indicates a number of symbols, and wherein each of the number of symbols has an absolute length related to a subcarrier spacing (SCS).

11. A network node, comprising:

at least one processor configured to:

receive, via a receiver from a wireless communication node, beam information and time domain information, wherein the time domain information is associated via a one-to-one mapping relationship with the beam information, wherein the time domain information is to indicate a time interval in which the beam information is to be applied by the network node, wherein the time domain information indicates a start time and a duration, wherein the start time indicates a start slot and a start symbol, wherein the duration indicates a number of symbols, and wherein each of the number of symbols has an absolute length related to a subcarrier spacing (SCS).

12. The network node of claim 11, wherein the network node is to use, according to the beam information and the time domain information:

a first forwarding link from the wireless communication node to the network node;

a second forwarding link from the network node to the wireless communication node;

a third forwarding link from the network node to a wireless communication device; or a fourth forwarding link from the wireless communication device to the network node.

13. The network node of claim 11, wherein the beam information comprises an index of a beam.

14. The network node of claim 11, wherein the time domain information indicates an applicable time defined by a plurality of parameters.

15. The network node of claim 14, wherein the applicable time has the start time that corresponds to at least one of the start slot or the start symbol, and the duration.

16. The network node of claim 15, wherein the duration comprises a value indicating a number of symbols.

17. The network node of claim 14, wherein the applicable time corresponds to a symbol with the absolute length determined corresponding to the subcarrier spacing (SCS).

18. The network node of claim 11, wherein the at least one processor is configured to:

send, by a transmitter via a downlink control information (DCI) to the wireless communication node, the time domain information and the beam information.

19. The network node of claim 11, wherein the at least one processor is configured to:

send, by a transmitter via a radio resource control (RRC) message to the wireless communication node, a plurality of time domain information, and send, by the transmitter via a downlink control information (DCI) message to the wireless communication node, an indication of the time domain information to select from the plurality of time domain information to apply.

20. A method comprising:

sending, by a wireless communication node to a wireless network node, beam information and time domain information, wherein the time domain information is associated via a one-to-one mapping relationship with the beam information, wherein the time domain information is to indicate a time interval in which the beam information is to be applied by the wireless network node, wherein the time domain information indicates a start time and a duration, wherein the start time indicates a start slot and a start symbol, wherein the duration indicates a number of symbols, and wherein each of the number of symbols has an absolute length related to a subcarrier spacing (SCS).

* * * * *